Figure 1:
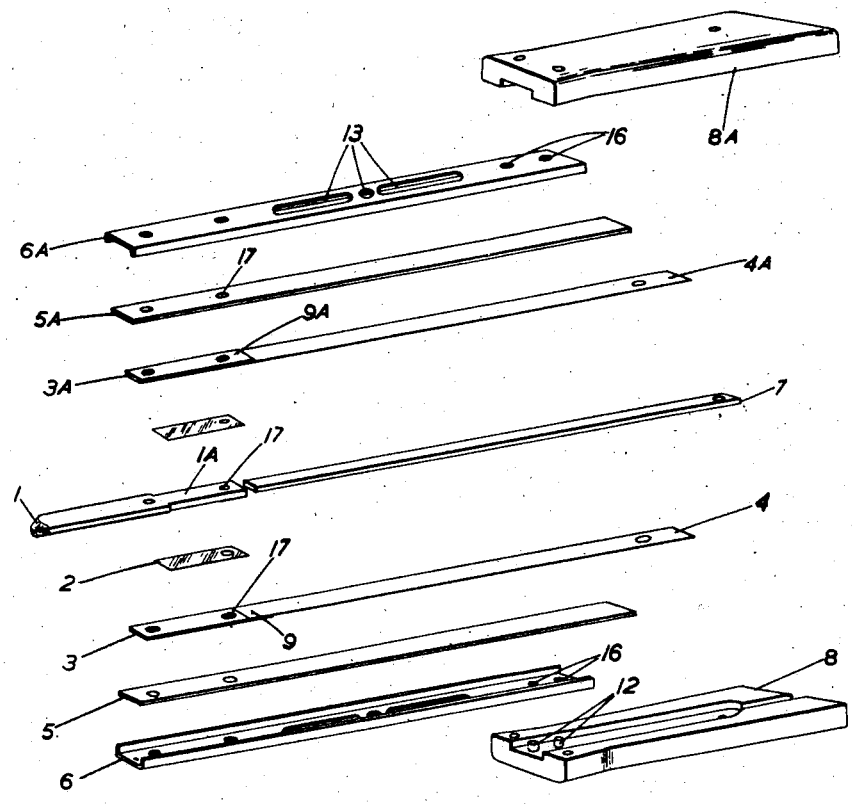

Dec. 28, 1948.   G. GILLIVER   2,457,143
ELECTRIC SOLDERING IRON

Filed July 20, 1943   2 Sheets-Sheet 1

Inventor
Gilbert Gilliver.
By
Attorney

Dec. 28, 1948. G. GILLIVER 2,457,143
ELECTRIC SOLDERING IRON
Filed July 20, 1943 2 Sheets-Sheet 2
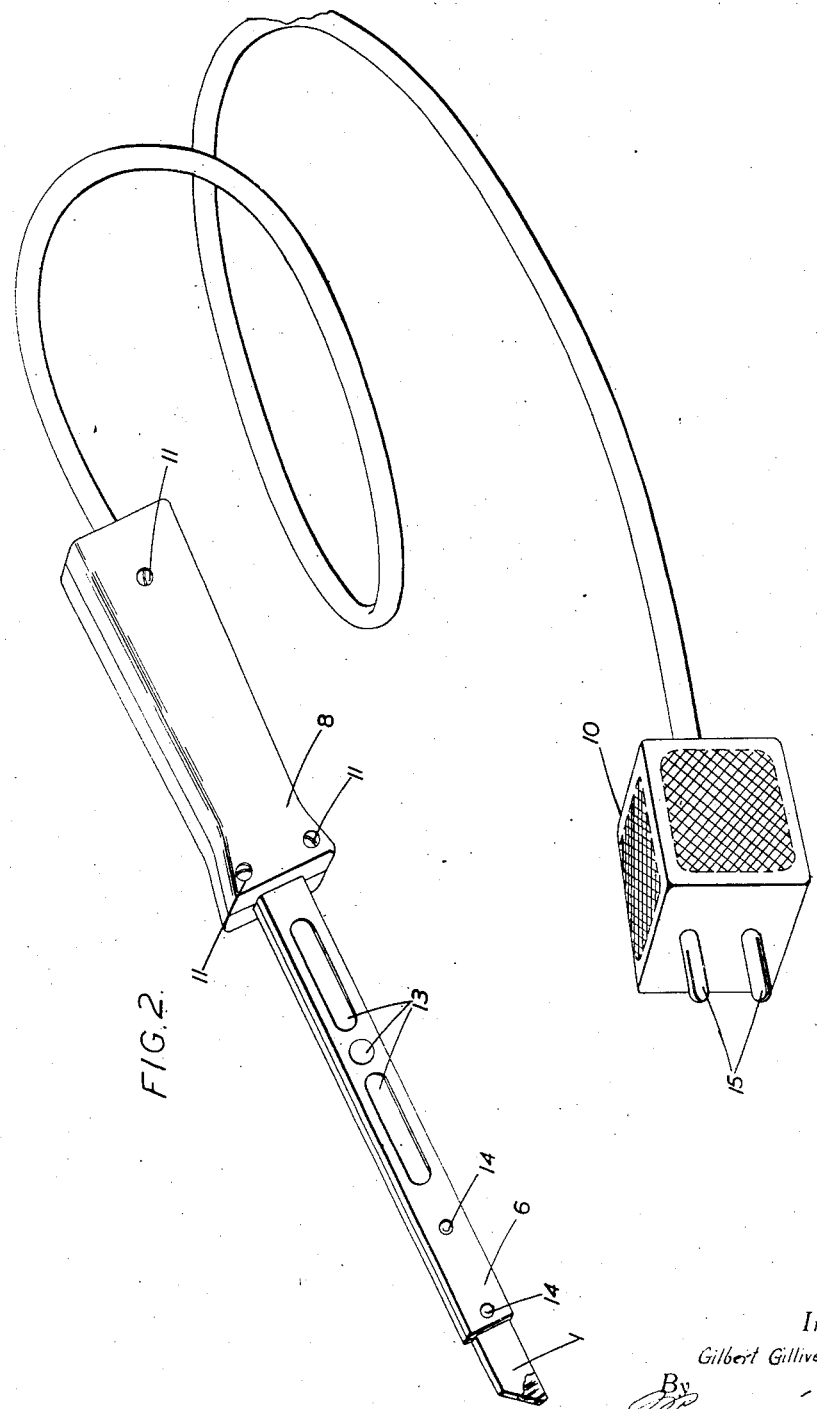
Inventor
Gilbert Gilliver.
By
Attorney Patented Dec. 28, 1948

2,457,143

UNITED STATES PATENT OFFICE 2,457,143

ELECTRIC SOLDERING IRON

Gilbert Gilliver, London, England, assignor, by mesne assignments, to International Standard Electric Corporation, New York, N. Y., a corporation of Delaware Application July 20, 1943, Serial No. 495,417
In Great Britain October 23, 1942

5 Claims. (Cl. 219—26)

This invention relates to electric soldering irons and has for its object to provide a soldering iron which will be economical to manufacture and efficient and safe in operation.

According to one feature of the invention we provide an electric soldering iron wherein the heating element comprises one or more strips of high electric resistance material positioned to be in heat conductive relation to the bit (or an extension thereof) and means for passing a low voltage electric current through said resistance material.

According to another feature of the invention we provide a soldering iron of the type comprising a bit with an electrical heating element therefor characterised in that the heating element comprises a strip of high electric resistance material positioned along an extension of the bit to be in heat conductive relation therewith but electrically insulated therefrom along at least a portion of its length.

Preferably the heating element consists of two strips of high resistance material, one on each side of an extension of the bit and according to yet another feature of the invention, therefore, we provide an electric soldering iron comprising a strip of high electric resistance material lying along each side of an extension of the bit, electrically insulated from but in good heat conductive relation with said extension for the greater part of their respective lengths and connected together at one end and to respective terminals of a source of low voltage electric supply at their other ends.

The invention enables an electric soldering iron to be constructed entirely from stampings and according to still another feature of the invention we provide an electric soldering iron comprising a pair of channel shaped members for supporting the bit and housing the electric conductors, strips of electric resistance material connected to said electrical conductors and positioned along an extension of the bit within said channel shaped members to be in heat conductive relation with said extension, means for electrically insulating the strips from the bit along at least the greater portion of their lengths, means for electrically and heat insulating the said channel-shaped members from the bit and from said conductors and means to clamp the parts together and to make an electrical connection between the ends of said resistance strips remote from the electrical conductors.

Preferably the two strips are connected together by each being secured to the extension of the bit.

In its preferred embodiment the invention provides an electric soldering iron for use with such low voltage that there is no danger at all of shock to the user even if the insulation of the iron should become imperfect. The soldering iron is accordingly constructed to give adequate heating of the iron with a voltage of as low as 4 volts and a transformer for stepping down the ordinary mains voltage to this figure is incorporated in the plug by means of which the soldering iron is connected to a socket connected to the mains.

The invention will be better understood from the following description of a preferred embodiment thereof taken in conjunction with the accompanying drawing in which Fig. 1 is an exploded view showing the parts from which the electric soldering iron is built up, whilst Fig. 2 shows the assembled soldering iron ready for connection to a mains supply.

Referring to the drawings 1 is the bit having an extension 1A. In line with the extension 1A is placed a strip 7 preferably of moulded electric insulating material for a purpose described hereinafter. On the two sides of the extension 1A are placed strips 2 and 2A of mica which affords good electrical insulation whilst giving also comparatively good heat conduction through it. On the sides of the strips 2 and 2A away from the bit are strips 3 and 3A longer than the strips 2 and 2A and of a nickel chromium alloy having high electrical resistance. These strips overlap the mica strips at their forward ends, i. e. towards the bit 1 and these forward ends are after assembly clamped against the bit 1 in a manner described hereinafter. At their rear ends strips 3 and 3A are spot welded at 9 and 9A to connecting leads 4 and 4A respectively in the form of flat copper strips. The connecting leads are insulated from one another by the strip 7 above referred to. On the outer side of resistance strips 3, 3A and their connecting leads 4, 4A are laid strips 5, 5A of asbestos heat insulation material and outside these are channel shaped members 6 and 6A of metal. These members are cut away as shown at 13 to help keep channels as cool as possible and to expose to view part of the strips 5 and 5A. Information as to the wattage of the iron or other matter may be marked on the exposed portions of these strips.

The parts are assembled together in the order shown and are then clamped together by means of eyelets 14, Fig. 2, holes being provided in the parts as shown in Fig. 1 for passage of these eyelets. The holes 17 in the strips 3 and 3A and in the extension 1A of the bit are of larger diameter than the cylinders used to form the eyelets so that the strips 3 and 3A are not short circuited by the members 6, 6A or by the bit. The assembly thus formed is inserted at its rear end into a handle formed by two mouldings 8 and 8A of insulating material such as a thermosetting synthetic resin adapted to be clamped together by screws 11. The rear ends of the copper strips 4, 4A are soldered or welded to electric conductors which extend to the secondary of a step down transformer 10 the primary of which is adapted to be connected to a mains supply. The transformer 10 is combined with a plug intended for insertion into a convenient socket, the primary of the transformer being connected to the pins 15 of the plug.

The two parts 8, 8A of the handle are formed with upstanding pins 12 which fit into holes 16 in the channel members 6, 6A which are thus held in fixed relationship to the handle.

The soldering iron above described can be adequately heated by a voltage of 4 volts and can be arranged for wattages from 12 to 30 thus being very economical in power compared with known forms of electric soldering iron.

What is claimed is:

1. An electric soldering iron comprising a bit formed with a flattened extended heat conducting portion, a pair of oppositely positioned channel members, flat current-conducting strips of electric resistance material interposed between the channel members and the bit extension and facing said bit extension, the areas of the facing surfaces of said extension and said strips being substantially equal and continuous means for electrically insulating the strips from the bit along at least the greater portion of their lengths, means for electrically and heat insulating the channel members from the bit, conductors connected to the strips at one end thereof and common means to clamp the parts together and to electrically connect the opposite ends of the resistance strips.

2. In an electric soldering iron, a bit extending into a flat heat conductor, a flat current conductor of high electric resistance having a substantially continuous face whose area is substantially equal to the area of one side of said heat conductor mounted adjacent said side of the heat conductor substantially parallel thereto, another flat current conductor of high electric resistance having a substantially continuous face whose area is substantially equal to the area of the other side of said heat conductor mounted adjacent said other side of the heat conductor substantially parallel thereto, heat-conducting electrical insulation in at least part of the space formed between said heat and said current conductors, means for connecting the current conductors in series, and common clamping means for fastening said heat and said current conductors together.

3. In an electric soldering iron according to claim 2, a bit forming the end of a flat heat-conducting strip, an electrically insulating strip of substantially equal width longitudinally continuing the heat-conducting strip, current conductors including two strips facing the two sides of, and having substantially the same width as, the heat-conducting strip and the continuing insulating strip, and heat-conducting electrical insulation consisting of insulating films separating at least a portion of the heat-conducting strip from the adjacent current-conducting strips.

4. In an electric soldering iron according to claim 2, a bit forming the end of a flat heat-conducting strip, an electrically insulating strip of substantially equal width longitudinally continuing the heat-conducting strip, current conductors including two strips facing the two sides of, and having substantially the same width as, the heat-conducting strip and the continuing insulating strip, heat-conducting electrical insulation consisting of insulating films separating at least a portion of the heat-conducting strip from the adjacent current-conducting strips, fastening means including oppositely positioned longitudinal metal frames formed to receive current-conducting and heat-conducting strips therebetween, heat-insulating strips extending substantially along said metal frames and separating them from the current-conducting strips, and common clamping means for joining frames, insulating strips, current conductors, heat conductors and insulating films together to form a single unit.

5. In an electric soldering iron according to claim 2, a bit forming the end of a flat heat-conducting strip, an electrically insulating strip of substantially equal width longitudinally continuing the heat-conducting strip, current conductors including two strips facing the two sides of, and having substantially the same width as, the heat-conducting strip and the continuing insulating strip, heat-conducting electrical insulation consisting of insulating films separating at least an end portion of the heat-conducting strip from the adjacent current-conducting strips except at their end portions, fastening means including oppositely positioned longitudinal metal frames formed to receive current-conducting and heat-conducting strips therebetween, heat-insulating strips extending substantially along said metal frames and separating them from the current-conducting strips, common clamping means for joining frames, insulating strips, current conductors, heat conductors and insulating films together to form a single unit, a handle surrounding at least a portion of said frames and attached thereto, a cable having one end received in the handle and connected to the current conductors, and a step-down transformer connected to the other end of said cable.

GILBERT GILLIVER.

REFERENCES CITED

The following references are of record in the file of this patent:

UNITED STATES PATENTS

| Number | Name | Date |
|---|---|---|
| 423,223 | Dewey | Mar. 11, 1890 |
| 1,042,432 | Hadaway, Jr. | Oct. 29, 1912 |
| 1,370,136 | Lightfoot | Mar. 1, 1921 |
| 1,422,721 | Lamb | July 11, 1922 |
| 1,520,913 | Simon | Dec. 30, 1924 |
| 1,757,895 | Asch | May 6, 1930 |
| 1,881,698 | Kuriyama | Oct. 11, 1932 |
| 2,106,439 | Schubert | Jan. 25, 1938 |

FOREIGN PATENTS

| Number | Country | Date |
|---|---|---|
| 389,309 | Germany | Feb. 7, 1924 |
| 731,472 | France | May 30, 1932 |